United States Patent
Tsau et al.

(10) Patent No.: US 8,892,163 B2
(45) Date of Patent: Nov. 18, 2014

(54) IMAGE SENSOR HAVING A PULSED MODE OF OPERATION

(75) Inventors: Guannho George Tsau, San Jose, CA (US); Anson Hoi-Fung Chan, San Jose, CA (US)

(73) Assignee: Omni Vision Technologies, Inc., Santa Clara, CA (US)

( * ) Notice: Subject to any disclaimer, the term of this patent is extended or adjusted under 35 U.S.C. 154(b) by 229 days.

(21) Appl. No.: 13/412,872

(22) Filed: Mar. 6, 2012

(65) Prior Publication Data

US 2013/0237280 A1    Sep. 12, 2013

(51) Int. Cl.
*H04M 1/00*    (2006.01)

(52) U.S. Cl.
USPC ............. 455/556.1; 455/127.5; 455/343.2; 250/208.1; 250/206.1; 250/214 R; 250/340; 250/338.1; 348/294; 348/296

(58) Field of Classification Search
USPC .......... 455/556.1, 343.1, 343.2, 343.3, 127.5; 356/51; 600/181; 250/208.1, 206.1, 250/214 R, 340, 338.1; 348/294, 296, 348/E05.091
See application file for complete search history.

(56) References Cited

U.S. PATENT DOCUMENTS

| | | | |
|---|---|---|---|
| 2005/0165279 A1* | 7/2005 | Adler et al. | 600/181 |
| 2011/0006190 A1* | 1/2011 | Alameh et al. | 250/206.1 |
| 2012/0162636 A1* | 6/2012 | Sy | 356/51 |
| 2012/0265482 A1* | 10/2012 | Grokop et al. | 702/141 |

* cited by examiner

*Primary Examiner* — Junpeng Chen
(74) *Attorney, Agent, or Firm* — Blakely Sokoloff Taylor & Zafman LLP

(57) ABSTRACT

An image sensor includes a pixel array having a plurality of pixels. A readout circuit is coupled to the pixel array. A controller circuit is coupled to control the pixel array and is coupled to the readout circuit to receive array data from the pixel array. The controller circuit includes a mode control logic unit providing logic which when executed causes the image sensor operate in an idle mode of operation and then sample in response to receiving an event signal array data received from the pixel array in a pulsed mode of operation. A pattern in the array data samples over time is recognized and a mode of operation is selected in response to the recognized pattern.

22 Claims, 3 Drawing Sheets

IMAGE SENSOR HAVING A PULSED MODE OF OPERATION

BACKGROUND INFORMATION

1. Field of the Disclosure

The present invention relates generally to image sensors. More specifically, embodiments of the present invention are related to an image sensor including a pulsed mode of operation.

2. Background

Electronic devices require power to operate. There are continuing efforts to reduce power consumption in electronic devices to conserve energy as well as to reduce the size and materials necessary to implement the corresponding power supplies that are used as power sources to provide the required power to the electronic devices. Batteries are typically used as power sources to provide power for mobile electronic devices, such as for example mobile phones or other portable electronic devices. Electronic devices that continuously consume power can quickly drain a battery. In order to prolong battery life between charges, low power consumption in mobile electronic devices is an important design consideration.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
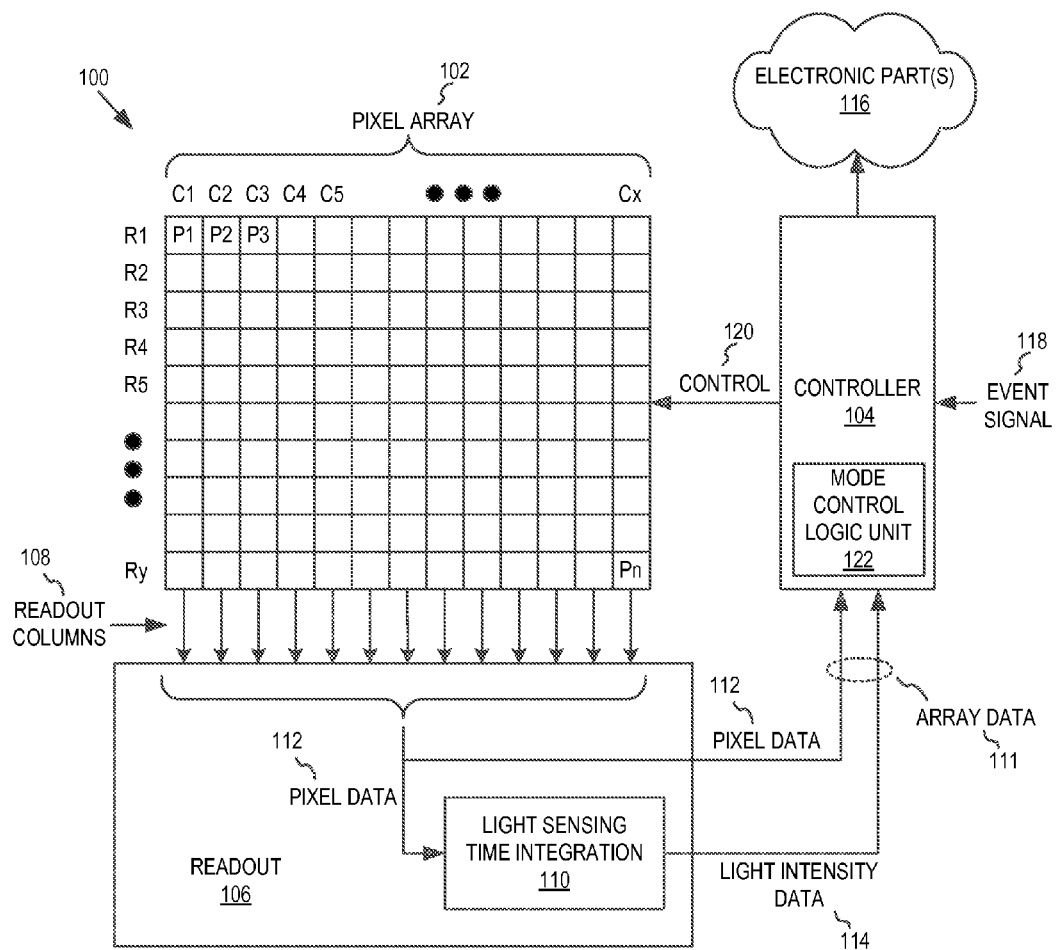
FIG. 1 is a diagram illustrating one example of an image sensor including a pulsed mode of operation in accordance with the teachings of the present invention.

As will be shown, methods and apparatuses that include an image sensor having a pulsed mode of operation are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be shown, examples of methods and apparatuses having an image sensor including a pulsed mode of operation are disclosed. An image sensor having a pulsed mode of operation, in addition to a normal mode of operation and an idle mode of operation, can provide image sensor functionality and features for an electronic device as needed for those scenarios that do not require the image sensor to operate continuously. In particular, some scenarios only require that the image sensor operate periodically in a pulsed mode of operation rather than continuously in a normal mode of operation. By operating in a pulsed mode of operation rather a continuous or normal mode of operation, power consumption of an electronic device having such an image sensor can be reduced considerably. Furthermore, in some scenarios, an image sensor operating in the pulsed mode of operation can be used to recognize the particular scenario in which an electronic device is operating, and other electronic parts included in the electronic device can be controlled accordingly to reduce power consumption if possible. For instance, once a particular scenario is recognized by the image sensor, other electronic parts or function can be activated or deactivated as needed to provide more efficient power consumption in accordance with the teachings of the present invention.

To illustrate, FIG. 1 is a diagram illustrating one example of an image sensor 100 in accordance with the teachings of the present invention. In particular, example image sensor 100 includes a pixel array 102 having a plurality of pixels, which are labeled as P1, P2, P3 . . . Pn. In the example, the pixels of pixel array 102 are organized in columns C1, C2, C3 . . . . Cx and rows R1, R2, R3 . . . Ry. As shown in the depicted example, a readout circuit 106 and a controller circuit 104 are coupled to pixel array 102. In one example, controller circuit 104 is coupled to receive an event signal 118 and is coupled to control pixel array 102 with a control signal 120. It is appreciated that control signal 120 may include collectively a plurality of individual signals, which may be used to control individually circuitry of each pixel, row and/or column of pixel array 102. In one example, controller circuit is also coupled to control one or more electronic part(s) 116. As shown in the depicted example, controller circuit 104 is further coupled to readout circuit 106 to receive array data 111 from pixel array 102 received through readout columns 108 as shown. In one example, array data 111 may include pixel data 112 and/or light intensity data 114. In one example, light intensity data 114 is output in response to pixel data 112 from a light sensing time integration circuit 110, which in the illustrated example is shown being included in readout circuit 106. In another example, it is appreciated that light sensing time integration circuit 110 may be separate from readout circuit 106 without departing from the scope of the teachings of the present invention.

As shown in the example depicted in FIG. 1, controller circuit 104 includes a mode control logic unit 122 that in one example includes logic, which when executed causes operations to be performed. It is appreciated that the logic included in mode control logic unit 122 may by implemented using a combination or a variety of suitable techniques including, but not limited to, state machine circuitry, sample and hold circuitry, application specific integrated circuitry, processor circuitry with a corresponding machine-accessible storage medium providing instructions executed by the processor circuitry, or the like.

In operation, one example of image sensor 100 may initially be operating in an idle mode of operation, which may for example correspond to an electronic device in a sleep mode or dormant mode. While in the idle mode of operation, image sensor 100 is in a low power mode and therefore consumes relatively little power.

In one example, controller circuit 104 of image sensor 100 may then receive event signal 118, which for example may correspond to an external trigger for which action is appropriate. For instance, if image sensor 100 is included in an electronic device such as a mobile phone or smart phone, event signal 118 may indicate that the phone is receiving an incoming communication such as a telephone call, text message or the like. On the other hand, if image sensor 100 is included in an electronic device such as a handheld barcode reader, event signal 118 may be received from a trigger or a motion detector on the barcode reader indicating that the barcode scanner is being picked up and is therefore initiating the process of scanning for a barcode or the like. If, for example, image sensor 100 is included in an electronic device such as a security system, event signal 118 may indicate that the security system is being activated to begin the process of scanning the field of view of the image sensor to recognize any potential security threats or the like. If, for example, image sensor 100 is included in an electronic device such as a television or computer input device, event signal 118 may indicate that the image sensor 100 is being activated to begin the process of receiving input information such as for example video information or gesture based movements to control the television or computer or the like. Of course, the examples listed above are provided for explanation purposes only and other possible applications may be utilized for image sensor 100 having a pulsed mode of operation in accordance with the teachings of the present invention.

In one example, after receiving event signal 118, image sensor 100 transitions from the idle mode of operation to a pulsed mode of operation in accordance with the teachings of the present invention. While operating in the pulsed mode of operation, controller circuit 104 begins sampling array data 111 received from pixel array 102 in response to receiving event signal 118. As shown in FIG. 1, array data 111 may include pixel data 112 and/or light intensity data 114. Light sensing time integration circuit 110 is included in image sensor 100 to output the light intensity levels of light that is incident upon pixel array 102. As shown in the example, light intensity data 114 may be included in array data 111, which is sampled in pulses by controller circuit 104 during the pulsed mode of operation. In other examples, it is appreciated that an external host such as for example an application processor, or a baseband processor or the like may be coupled to sample light intensity data 114 in accordance with the teachings of the present invention.

Continuing with the example illustrated in FIG. 1, after a plurality of samples of array data 111 are sampled, the logic included in mode control logic unit 122 evaluates the samples of array data 111 to recognize one or more patterns in the data samples. For instance, assume three samples of array data 111 are sampled over time at times t1, t2 and t3 and include light intensity data 114 that indicate light intensity levels of IL1, IL2 and IL3, respectively. If the pattern of array data 111 samples over time indicate that IL1>IL2>IL3, then it is recognized from the pattern of array data 111 that image sensor 100 is most likely being operated in a scenario in which it is getting darker over time. If, on the other hand, the pattern of array data 111 samples over time indicate that IL1<IL2<IL3, then it is recognized that image sensor 100 is most likely being operated in a scenario that is getting brighter over time.

Accordingly after recognizing the pattern in array data 111 samples over time, the logic in mode control logic unit 122 can now select an appropriate a mode of operation in response to the recognized pattern in array data 111 samples over time. Furthermore, in one example, the logic in mode control logic unit 122 can also control one or more electronic part(s) 116 in response to the recognized pattern in array data 111 samples over time in accordance with the teachings of the present invention.

Figure 2:
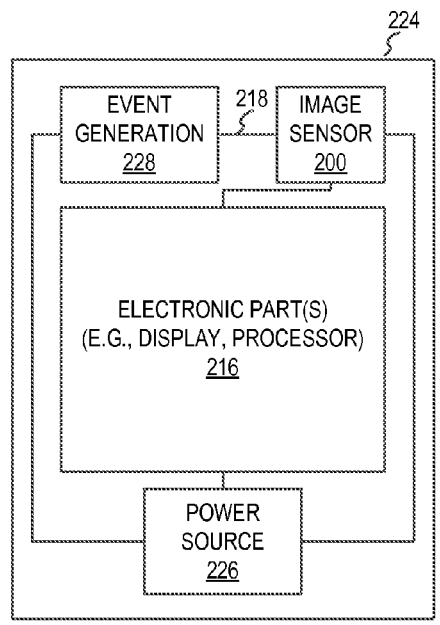
FIG. 2 is a diagram illustrating one example of an electronic device including an example image sensor having a pulsed mode of operation in accordance with the teachings of the present invention.

To illustrate, FIG. 2 is a diagram illustrating one example of an electronic device 224 including an example image sensor 200 in accordance with the teachings of the present invention. In one example, it is appreciated that image sensor 200 of FIG. 2 is similar to image sensor 100 of FIG. 1, and that image sensor 100 can therefore be utilized in place of image sensor 200 in accordance with the teachings of the present invention. Thus, as discussed above with respect to FIG. 1, image sensor 200 also includes a pulsed mode of operation, which enables pulsed controlled imaging, which is more energy efficient than the continuous imaging of a normal mode of operation in accordance with the teachings of the present invention.

It is appreciated that example electronic device 224 of FIG. 2 may represent any variety of electronic devices that may include image sensors, such as for example but not limited to a mobile phone, a smart phone, a barcode scanner, a security system, a television input device, a computer input device or any other suitable electronic device including an image sensor. As shown, electronic device 224 of FIG. 2 includes an event generation circuit 228, which generates an event signal 218 that is coupled to be received by image sensor 200. In a smart phone example, event generation circuit 228 may correspond to circuitry in the smart phone for notifying electronic device 224 with event signal 218 that there is an incoming communication, such as a telephone call or text message to which action may be appropriate. Electronic part(s) 216 may correspond to one or more electronic parts included in electronic device 224, such as for example a touch screen display or processor in the smart phone example. In the example, a power source 226 is coupled to provide power to all of the electronic circuitry in electronic device 224. Power source 226 may be a battery or a power supply that is plugged into an external power source to provide power to electronic device 224. As will be described, power consumption from power source 226 is reduced with image sensor 200 having a pulsed mode of operation in accordance with the teachings of the present invention.

Assuming for example that electronic device 224 is a mobile phone or smart phone, image sensor 200 may be utilized to replace a front facing camera typically found on known smart phones. Known smart phones typically also include an ambient light sensor and a proximity sensor on the front of the smart phones. The ambient light sensors are used to dim down the screen when the surrounding area is dark. The proximity sensors are used to turn off the touch screen display when the user holds the smart phone close to his or her face. Referring back to the example illustrated in FIG. 2, it is appreciated that image sensor 200 eliminates the need for an ambient light sensor as well as the need for a proximity sensor, while at the same time saves on power consumption in accordance with the teachings of the present invention. In particular, as will be discussed in further detail below, image sensor 200 with pulse controlled image taking in a pulsed mode of operation can be used to replace the known front facing camera, ambient light sensor and proximity sensor to deactivate unneeded functions of electronic part(s) 216 (e.g., display, processor etc) or set them into a low power mode of operation to reduce power consumption from power source 226 in accordance with the teachings of the present invention.

Figure 3:
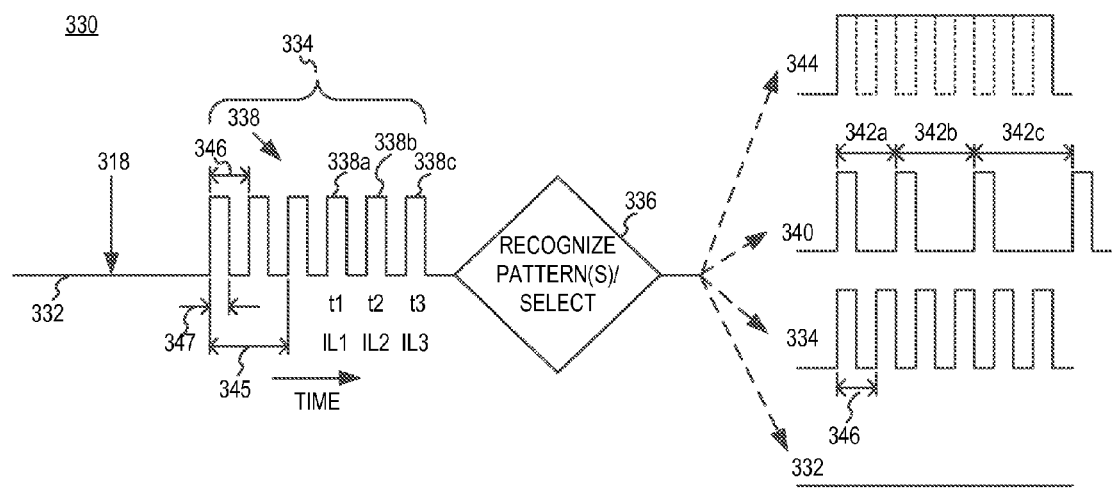
FIG. 3 is a diagram illustrating one example of an activity curve of the activity of an example electronic device having an example image sensor with a pulsed mode of operation in accordance with the teachings of the present invention.

To illustrate, FIG. 3 is a diagram illustrating one example of an activity curve 330, which represents activity of an example an electronic device having an example image sensor with a pulsed mode of operation in accordance with the teachings of the present invention. Assume in one example that the electronic device is a smart phone according to example electronic device 224 of FIG. 2 and that the image sensor is for example a front facing camera corresponding to example image sensor 200 of FIG. 2 and/or example image sensor 100 of FIG. 1.

In the illustrated example activity curve 330 of FIG. 3, an electronic device 224 such as for example a smart phone, is initially operating in an idle mode of operation 332 and is therefore consuming relatively little power. An event signal 318 is then received, which may indicate that the smart phone is receiving an incoming communication such as a phone call or text message. Accordingly, the logic of mode control logic unit 122 transitions the activity in activity curve 330 to a pulsed mode of operation 334. As illustrated in the example, a plurality of pulses 338 are representative of pulses of activity over time during pulsed mode of operation 334. In one example, pulses 338 represent when activity occurs within image sensor 200 during the pulsed mode of operation. It is appreciated of course that the square wave format illustrated in activity curve 330 is only a visual representation of activity of the modes operation for explanation purposes and that activity curve 330 does not represent necessarily any specific signal in image sensor 100 or image sensor 200. Since the activity is pulsed and therefore not continuous as would be the case during a normal mode of operation, there is a savings in power consumption in accordance with the teachings of the present invention.

In the example, it is noted that pulses 338 are not necessarily illustrated to scale and are illustrated as occurring periodically at a fixed time interval 346 during the pulsed mode of operation. However, it is noted that in an alternate pulsed mode of operation, as will be described in further detail below, it is appreciated that the time interval between pulses may also be varied in accordance with the teachings of the present invention.

Continuing with the example depicted in FIG. 3, each of one of pulses 338 also have a fixed pulse width 347, which in one example has a duration less than a predetermined sample time period 345 in which example controller circuit 104 samples array data 111 in accordance with the teachings of the present invention. Thus, in one example, there are one or more pulses 338 within predetermined sample time period 345. In one example, predetermined sample time period 345 is 5 ms. It is appreciated of course that 5 ms is only an example provided for explanation purposes and that other durations of time may be utilized for predetermined sample time period 345 in accordance with the teachings of the present invention. In one example, each one of the samples of array data 111 over time includes light intensity data 114 samples in accordance with teachings of the present invention. Thus, in one example, controller circuit 104 in combination with light sensing time integration circuit 110 sample the average intensity of light incident on pixel array 102 for predetermined sample time period 345 intervals of 5 ms to acquire intensity levels.

In the example depicted in FIG. 3, a sample of light intensity data 114 is sampled during pulse 338a at time=t1. In one example, time=t1 occurs at approximately 0~5 ms after the receipt of event signal 318. Continuing with the example, another sample of light intensity data 114 is subsequently sampled during pulse 338b at time=t2. In one example, time=t2 occurs at approximately 10~15 ms after the receipt of event signal 318. Yet another sample of light intensity data 114 is then sampled during pulse 338c at time=t3. In one example, time=t3 occurs at approximately 30~35 ms after the receipt of event signal 318. In the example, it is assumed that the sample of light intensity data 114 sampled during pulse 338a is equal IL1, that the sample of light intensity data 114 sampled during pulse 338b is equal IL2, and that the sample of light intensity data 114 sampled during pulse 338c is equal IL3.

It is appreciated that occurrences of t1, t2 and t3 at 0~5 ms, 10~15 ms and 30~35 ms are provided as examples for explanation purposes, and that other times could be used depending on the application in accordance with the teachings of the present invention. For instance, in other examples, image sensor 200 may sample array data 111 every 30 ms, at 30 ms, 60 ms, 90 ms and so on. In another example, image sensor 200 may sample array data 111 every minute, at 1 minute, 2 minutes, 3 minutes and so on. In each example, compared with continuous image taking, intermittent or periodic pulse image taking consumes less power in accordance with the teachings of the present invention.

Continuing with the example shown in FIG. 3, decision block 336 illustrates that the pattern of light intensity data 114 samples IL1, IL2 and IL3 of array data 111 over time is then recognized and that the appropriate subsequent mode of operation is then selected according to the recognized pattern in accordance with the teachings of the present invention.

For instance, in the smart phone example, if the pattern of IL1, IL2 and IL3 in the samples of array data 111 indicates that IL1>IL2>IL3, then the most likely scenario is that the ambient light incident upon pixel array 102 is getting darker, which is consistent with a user bringing the smart phone up to his or her ear after receiving an incoming phone call. As a result, in one example, the logic of mode control logic unit 122 deactivates the touch screen display (i.e., electronic part 216) so that the user's cheek does not inadvertently hang up the phone call.

In one example, the pattern of array data 111 samples may also include pixel data 112, which may include sampled image information over time acquired by pixel array 102 during pulse 338a, 338b and 338c. Thus, in one example, the pattern in pixel data 112 samples over time may be representative of an object that is recognized in images captured by the pixel array. With object recognition, or image recognition, patterns or objects in the images can be recognized and then the appropriate processing can then be performed in accordance with the teachings of the present invention. For instance, if the pattern of images included in the samples of array data 111 are recognized as for example a human ear, then this information is also consistent with the user bringing the smart phone up to his or her ear after receiving an incoming phone call. As a result, the logic of mode control logic unit 122 also deactivates the touch screen display (i.e., electronic part 216) so that the user's cheek does not inadvertently hang up the phone call.

In one example, the logic of mode control logic unit 122 may select pulsed mode of operation 334 or an alternate pulsed mode of operation 340 during the phone call while the user has the smart phone up to his or her ear. As shown in the example, alternate pulsed mode of operation 340 is similar to pulsed mode of operation 334 as it includes pulses of operation, which is more energy efficient when compared to a normal mode of operation in which the operation is continuous. In the illustrated alternate pulsed mode of operation 340 example, the time interval between pulses, and therefore the time interval between samples of array data 111, is varied as illustrated with varying time intervals 342a, 342b and 342c. In one example, the varying time intervals 342a, 342b and 342c in alternate pulsed mode of operation 340 are varied to be longer than fixed time interval 346 in pulsed mode of operation 334. As a result, by varying time intervals 342a, 342b and 342c to be longer, a further reduction of power consumption is realized, which further increases power efficiency in accordance with the teachings of the present invention.

Continuing with the example, when the samples of array data 111 are evaluated and when a pattern of IL1, IL2 and IL3 in the samples of array data 111 indicates that IL1<IL2<IL3, then it is recognized that the most likely scenario is that the ambient light incident upon pixel array 102 is getting brighter, which is consistent with a user pulling the smart phone up away from his or her ear. As a result, in one example, the selected mode of operation would then be transitioned to a normal mode of operation 344 by the logic of mode control logic unit 122 and activate the touch screen display (i.e., electronic part 216) so that the user can now interact with the touch screen display. As a result, since the user is no longer holding the smart phone up to his or her ear, the user may now interact with the smart phone touch screen display in a normal mode of operation 344.

Furthermore, in one example, it is appreciated when an event signal 218 is received indicating the phone call is now completed and/or if the pattern of array data 111 samples are consistent with a scenario that the user no longer wishes to use the smart phone, the selected mode of operation can then be transitioned back to an idle mode of operation 332 by the logic of mode control logic unit 122 and deactivate the touch screen display (i.e., electronic part 216) to reduce power consumption in accordance with the teachings of the present invention.

It is appreciated that an image sensor having a pulsed mode of operation in accordance with the teachings of the present invention as described above eliminates the need for an additional ambient light sensor as well as an additional proximity sensor. Therefore, a smart phone example utilizing an image sensor have the above described pulsed mode of operation also reduces the number of necessary parts in an electronic device by performing the various control functions and reducing overall system power consumption since a pulse mode of operation is more energy efficient than a continuous mode of operation.

It also appreciated that example electronic devices 224 other than smart phones benefit can also benefit from an image sensor having a pulsed mode of operation in accordance with the teachings of the present invention. To illustrate, electronic device 224 may for example be a handheld barcode scanner. In this example, event generation circuit 228 may include a motion detector or gyroscope, which sends event signal 218 when a user picks up or moves the barcode scanner to begin scanning. At this time, the barcode scanner can transition from idle mode of operation 332 to pulsed mode of operation 334, as shown in FIG. 3. If the pattern of images included in the samples of array data 111 are recognized in decision block 336 as a barcode, then the logic of mode control logic unit 122 transitions to normal mode of operation 344 and fully activates the processor (e.g., electronic part 216) to begin what could be complex image processing on pixel data 112 to decode the barcode image for the encoded information. If, on the other hand, no barcode is recognized in the pattern of images included in the samples of array data 111, then the logic of mode control logic unit 122 transitions to alternate pulsed mode of operation 340 and the processor (e.g., electronic part 216) is controlled to remain in a low power mode to conserve power until a pattern of an image of a barcode is recognized in decision block 336.

In yet another example, electronic device 224 could be a security system including an image sensor 200. In such an example, electronic device 224 can be activated as indicated with event signal 218 and image sensor 200 could be operated in pulsed mode of operation 334 while monitoring an area in the field of view of image sensor 200. When the pattern of images included in the samples of array data 111 are recognized in decision block 336 as possible security threat, then the logic of mode control logic unit 122 transitions to normal mode of operation 344 and activates the processor (e.g., electronic part 216) to begin processing for the possible security threat (e.g., sounding an alarm, turning on a security flood light, etc.). If, on the other hand, no security threat is recognized in the pattern of images included in the samples of array data 111, then the image sensor remains in pulsed mode of operation 334 until a security threat is recognized, or until the security system is deactivated, which would cause the logic of mode control logic unit 122 to transition to idle mode of operation 332.

In still another example, electronic device 224 could be an input device to a television or a computer including an image sensor 200. In such an example, electronic device 224 can be activated as indicated with event signal 218 and image sensor 200 could operate in pulsed mode of operation 334 while monitoring an area in the field of view of image sensor 200. If, for example, the pattern of images included in the samples of array data 111 are recognized in decision block 336 as possible as human gestures, then the logic of mode control logic unit 122 transitions to normal mode of operation 344 and fully activates the processor (e.g., electronic part 216) to begin processing array data 111 samples for human gestures. For example, the input device could be used to recognize patterns of human gestures to control a video game, or perhaps to control the television (e.g., change the channel or volume). If, on the other hand, no human or human gestures patterns are recognized in array data 111 samples, then the image sensor remains in pulsed mode of operation 334 until a human gesture is recognized, or when the television or computer is deactivated, which would cause the logic of mode control logic unit 122 to transition to idle mode of operation 332.

Figure 4:
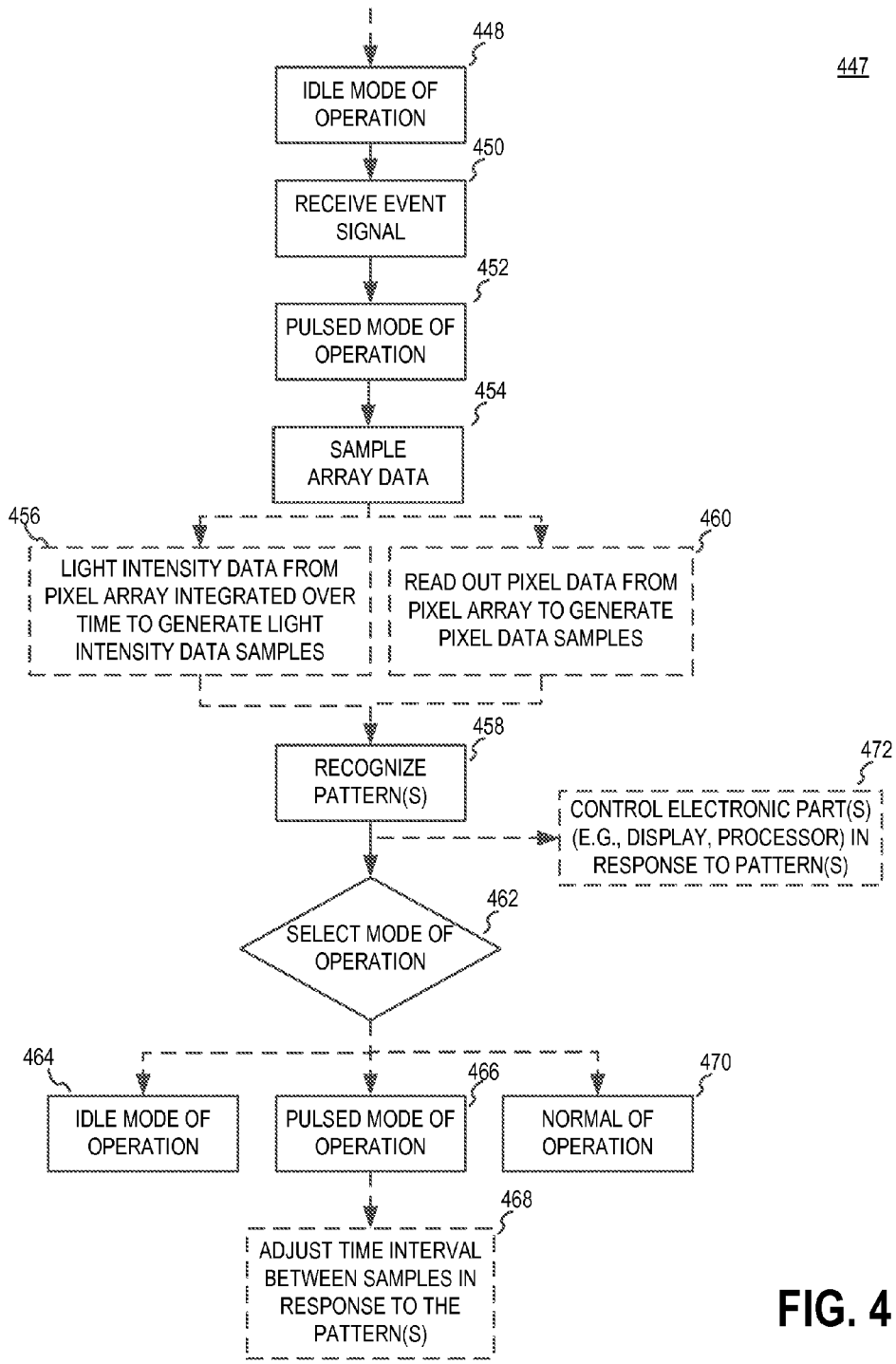
FIG. 4 is a diagram of an example flow diagram illustrating one example of processing that occurs in an example image sensor including a pulsed mode of operation in accordance with the teachings of the present invention.

FIG. 4 is a diagram of an example flow diagram 447 illustrating one example of processing that occurs an example image sensor including a pulsed mode of operation in accordance with the teachings of the present invention. It is appreciated that the example image sensor could be the example image sensor described above with respect to FIG. 1, FIG. 2 and/or FIG. 3 above. As shown in the example described in FIG. 4, at processing block 448, the image sensor is shown to be initially operating in an idle mode of operation. At processing block 450, an event signal is received. As discussed in the examples described above, the event signal could be representative of an incoming communication for a smart phone, or movement of a barcode scanner, etc. After receiving the event signal, the electronic device in one example transitions from the idle mode of operation to a pulsed mode of operation, as indicated with processing block 452. In one example, array data from the pixel array is sampled during pulses of the pulsed mode of operation, as indicated with processing block 454. It is appreciated that since the array data is not sampled continuously, a savings in power is realized in accordance with the teachings of the present invention.

In one example, light intensity data from the pixel data array is integrated over time to generate light intensity data samples included in the array data samples, as indicated with processing block 456. In one example, pixel data from the pixel array may also be read out from the pixel array to generate pixel data samples included in the array data samples, as indicated with processing block 460.

Processing block 458 shows that patterns are then recognized in the array data samples. The array data samples may include the samples of light intensity data and/or samples of pixel data. The patterns array data samples may be representative of samples ambient light incident upon the pixel array over time and/or sequences of images sampled over time from the pixel array. The patterns may be the result of image recognition of objects in the images sampled by the pixel array.

Decision block 462 shows that the next mode of operation may then be selected in response to the pattern(s) that are recognized in processing block 458. For instance, the image sensor could transition to an idle mode of operation as indicated with processing block 464, or the image sensor could transition to a normal mode of operation as indicated with processing block 470, or the image sensor could remain in a pulsed mode of operation as indicated with processing block 466. Processing block 468 shows that the image sensor may also be operated in an alternate pulsed mode of operation by adjusting the time interval between taking the samples of array data in response to the pattern(s) that were recognized in processing block 458. In addition, processing block 472 shows that one or more other electronic parts could be controlled in response to the pattern(s) that were recognized in processing block 458. Other electronic parts may include a display, such as a touch screen display of a smart phone, a processor of an electronic device that could for example perform image processing or image recognition operations on the array data received from the pixel array.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor, comprising:
   a pixel array including a plurality of pixels;
   a readout circuit coupled to the pixel array; and
   a controller circuit coupled to control the pixel array, the controller circuit further coupled to the readout circuit to receive pixel data from the pixel array, wherein the pixel data is representative of an image of an object that is captured by the pixel array, the controller circuit including a mode control logic unit providing logic which when executed causes operations to be performed, comprising:
   operating the image sensor in an idle mode of operation, wherein the image sensor consumes less power from a power source when operating in the idle mode of operation;
   sampling, in response to receiving an event signal, the pixel data received from the pixel array in a pulsed mode of operation in which the image sensor alternates between operating in a normal mode of operation and the idle mode of operation, wherein the pulsed mode of operation provides pulse controlled imaging instead of continuous imaging, wherein a time interval between operating in the normal mode of operation and the idle mode of operation in the pulsed mode of operation is a fixed time interval;
   recognizing a pattern in the pixel data samples over time; and
   selecting a mode of operation in response to the pattern in the pixel data samples over time, wherein the mode of operation is one of a plurality of modes of operation of the image sensor, wherein the plurality of modes of operation include the idle mode of operation, the normal mode of operation, the pulsed mode of operation, and an alternate pulsed mode of operation, wherein the time interval between operating the normal mode of operation and the idle mode of operation in the alternate pulsed mode of operation is a variable time interval.

2. The image sensor of claim 1 wherein said sampling, in response to receiving the event signal, the pixel data received from the pixel array in the pulsed mode of operation comprises integrating light intensity data over time from the pixel array to generate light intensity data samples over time, wherein recognizing the pattern in the pixel data samples over time comprises recognizing a pattern in the light intensity data samples over time, and wherein selecting the mode of operation in response to the pattern in the pixel data samples comprises selecting the mode of operation in response to the pattern in the light intensity data samples over time.

3. The image sensor of claim 2 wherein the pattern in the light intensity data samples over time is representative of changes in ambient light intensity over time.

4. The image sensor of claim 2 wherein integrating the light intensity data over time from the pixel array comprises integrating the light intensity data from the pixel array over a predetermined sample time period to generate each one of the light intensity data samples.

5. The image sensor of claim 1 wherein said sampling, in response to receiving the event signal, the pixel data received from the pixel array in the pulsed mode of operation comprises reading out the pixel data from the pixel array to generate pixel data samples over time.

6. The image sensor of claim 5 wherein recognizing the pattern in the pixel data samples over time comprises recognizing an object in the pixel data samples, and wherein selecting the mode of operation in response to the pattern in the pixel data samples comprises selecting the mode of operation in response to the object recognized in the pixel data samples.

7. The image sensor of claim 1 wherein said operations to be performed further comprise controlling an electronic part comprised in an electronic device including the image sensor in response to the pattern in the pixel data samples over time.

8. The image sensor of claim 7 wherein the electronic part comprises a display.

9. The image sensor of claim 7 wherein the electronic part comprises a processor.

10. The image sensor of claim 1 wherein the image sensor consumes less power from the power source when operating in the pulsed mode of operation than when operating in the normal mode of operation, and wherein the image sensor consumes less power from the power source when operating in the idle mode of operation than when operating in the pulsed mode of operation.

11. An electronic device, comprising:
a power source;
an image sensor coupled to receive power from the power source, the image sensor including:
a pixel array including a plurality of pixels;
a readout circuit coupled to the pixel array; and
a controller circuit coupled to control the pixel array, the controller circuit further coupled to the readout circuit to sample pixel data received from the pixel array in a pulsed mode of operation in response to an event signal, wherein the pixel data is representative of an image of an object that is captured by the pixel array, wherein the controller circuit includes a mode control logic unit coupled to selectively control the pixel array according to one of a normal mode of operation, an idle mode of operation, the pulsed mode of operation, and an alternate pulsed mode of operation, in response to a pattern of the pixel data samples over time, wherein the image sensor consumes less power from the power source when operating in the idle mode of operation, wherein the image sensor alternates between operating in a normal mode of operation and the idle mode of operation when operating in the pulsed mode of operation such that the pulsed mode of operation provides pulse controlled imaging instead of continuous imaging, wherein a time interval between operating in the normal mode of operation and the idle mode of operation in the pulsed mode of operation is a fixed time interval, wherein the time interval between operating the normal mode of operation and the idle mode of operation in the alternate pulsed mode of operation is a variable time interval; and
an electronic part coupled to receive power from the power source, the electronic part coupled to be responsive to the controller circuit of the image sensor.

12. The electronic device of claim 11 further comprising an event generation circuit coupled to generate the event signal.

13. The electronic device of claim 12 wherein the event generation circuit is coupled to generate the event signal in response to an incoming communication for the electronic device.

14. The electronic device of claim 13 wherein the incoming communication is an incoming telephone call and the electronic devices comprises a mobile phone.

15. The electronic device of claim 12 wherein the event generation circuit comprises a motion detection circuit and wherein the event signal is generated in response to motion detected by the motion detection circuit.

16. The electronic device of claim 11 wherein the image sensor is coupled to consume less power from the power source when operating in the idle mode of operation or operating in the pulsed mode of operation compared to operating in the normal mode of operation.

17. The electronic device of claim 11 wherein the controller circuit is coupled to selectively control the electronic part to consume less power from the power source in response to the pattern of the pixel data samples over time.

18. The electronic device of claim 11 wherein the readout circuit includes a light sensing time integration circuit coupled to integrate light intensity data from the pixel array over a predetermined sample time period to generate light intensity data samples comprised in the pixel data samples.

19. The electronic device of claim 18 wherein the patterns in the light intensity data samples received from the light sensing time integration circuit over time are representative of changes in ambient light intensity over time.

20. The electronic device of claim 11 wherein the controller circuit is further coupled to control the electronic part in response to the pattern of the pixel data samples over time.

21. The electronic device of claim 11 wherein the pattern of pixel data samples over time comprises a pattern of pixel data samples over time received from the readout circuit, wherein the controller circuit is coupled to control the electronic part in response to the pattern of the pixel data samples over time.

22. The electronic device of claim 21 wherein the pattern of the pixel data samples over time is the image of the object that is captured by the pixel array, wherein the controller circuit is coupled to recognize the object in the pixel data samples, and wherein the controller circuit is coupled to control the electronic part in response to the object that is recognized in the pixel data samples.

* * * * *